United States Patent [19]
Cook

[11] Patent Number: 5,343,583
[45] Date of Patent: Sep. 6, 1994

[54] RUNOFF GUARD AND DOCK LEVELER LOCKING APPARATUS

[75] Inventor: Bobby A. Cook, Malvern, Ark.

[73] Assignee: Dock Leveler Manufacturing, Malvern, Ark.

[21] Appl. No.: 865,444

[22] Filed: Apr. 9, 1992

[51] Int. Cl.$^5$ ............................................. E01D 1/00
[52] U.S. Cl. ...................................... 14/71.3; 14/71.1
[58] Field of Search .................... 14/69.5, 71.1, 71.3, 14/36, 37

[56] References Cited

U.S. PATENT DOCUMENTS

| | | |
|---|---|---|
| 3,475,779 | 11/1969 | Johnson . |
| 3,486,181 | 12/1969 | Hecker, Jr. et al. . |
| 3,636,578 | 1/1972 | Dieter .................... 14/71.3 |
| 3,872,948 | 3/1975 | Richards . |
| 3,933,256 | 1/1976 | Fagerlund . |
| 3,974,537 | 8/1976 | Ellis et al. . |
| 4,065,824 | 1/1978 | Ellis et al. . |
| 4,274,172 | 6/1981 | Franklin . |
| 4,420,849 | 12/1983 | Alten . |
| 4,525,887 | 7/1985 | Erlandsson et al. . |
| 4,665,579 | 5/1987 | Bennett et al. . |
| 4,689,846 | 9/1987 | Sherrod ................... 14/71.3 |
| 4,826,349 | 5/1989 | Nasatka . |
| 4,828,424 | 5/1989 | Crisp, Sr. . |
| 4,920,598 | 5/1990 | Hahn . |
| 4,935,979 | 6/1990 | Walker et al. .............. 14/71.1 |
| 5,195,205 | 3/1993 | Cook .......................... 14/71.1 |

Primary Examiner—Ramon S. Britts
Assistant Examiner—James A. Lisehora
Attorney, Agent, or Firm—Finnegan, Henderson, Farabow, Garrett & Dunner

[57] ABSTRACT

Dock leveler operable as a runoff guard includes a center plate pivotally connected to a base plate, a lip plate pivotally connected to the forward edge of the center plate, and a locking bar hingedly connected to the bottom surface of the center plate. The second end of the locking bar is adapted to swing into abutting engagement with a stop member mounted on the base plate when the center plate is pivoted into its upright rearward position to brace the center plate against pivotal movement in the forward direction. The dock leveler also includes a mechanical linkage extending between the base plate and the center plate for pivoting the center plate, and a removable lever arm for actuating the mechanical linkage. A first pivotal paddle is engageably-aligned with the mechanical linkage, and a second pivotal paddle, which is operatively connected to the first paddle, is engageably-aligned with the locking bar. Movement of the mechanical linkage, by the lever arm, pivots the paddles to automatically release the locking bar and permit subsequent pivotal movement of the center plate in the forward direction.

12 Claims, 7 Drawing Sheets

RUNOFF GUARD AND DOCK LEVELER LOCKING APPARATUS

BACKGROUND OF THE INVENTION

1. Field of the Invention

This invention relates to an edge-of-dock type dock leveler which is operable as a runoff guard for a loading dock platform and, more particularly, to an apparatus for locking an edge-of-dock type leveler in an upright rearward position to prevent accidental runoff of vehicles in use on the loading dock platform.

2. Description of Related Art

Forklift trucks and the like are frequently utilized on loading dock platforms to facilitate the loading and unloading of cargo carriers. Typically, however, forklift trucks cannot directly access the storage compartment of a carrier due to gaps and height variations between the platform and the carrier bed. To facilitate such access, a variety of methods have been developed; the most widely accepted of which is the dock leveler. Dock levelers are ramp-type apparatus generally designed to bridge the gap between the loading dock platform and a carrier bed, and to compensate for any existing height variations.

Typically, a dock leveler will have a center plate which pivots relative the loading dock platform and a lip plate which pivots relative a forward edge of the center plate. When the dock leveler is in use and fully extended, the lip plate rests directly on the bed of the carrier. As such, forklift trucks and the like can move freely between the loading dock platform and the carrier bed. When not in use, however, the dock leveler is typically stored with the center plate generally lying flush with the loading dock platform, and the lip plate hanging downwardly from the forward edge of the center plate. In this manner, the edge of the loading dock platform remains unobstructed, thereby creating the potential for a serious safety hazard.

Forklift trucks and the like can accidentally be driven off the unobstructed edge of a loading dock platform when the conventional dock leveler is in its standard storage position. This risk of accidental runoff is even greater due to the awkwardness in controlling forklift trucks, particularly those overladen with cargo. Likewise, loading dock platforms are frequently crowded with cargo and other obstacles, which further contributes to the difficulty in maneuvering around a loading dock and increases the potential for accidental runoff. Since loading dock platforms are typically elevated at least three feet from the ground, the consequence of accidental runoff can be disastrous both to equipment and personnel.

Recently, a few dock leveler designs have been developed to include various forms of automatic barriers to address the problem of accidental runoff. U.S. Pat. Nos. 4,920,598 and 5,040,298 disclose two different pit-mounted type dock levelers having automatic vehicle barriers. Although the dock levelers of U.S. Pat. Nos. 4,920,598 and 5,040,298 provide barriers against accidental runoff, several drawbacks in these designs are still quite evident. Most notably, pit-mounted type dock levelers tend to be expensive, both in construction and installation. This is particularly true when a pit-mounted type dock leveler is to be retrofitted into an existing loading dock platform.

Another common drawback of the dock levelers of U.S. Pat. Nos. 4,920,598 and 5,040,298 is the complexity of their designs. For example, the dock leveler of U.S. Pat. No. 4,920,598 requires that a hydraulically actuated assembly be mounted to the front of the dock leveler to permit both sliding and pivotal movement of the lip plate. This design complexity adds not only to the cost of construction, but also to the difficulty in both operation and maintenance. Due to the constant demands of loading and unloading carriers, loading dock personnel typically do not have the time to properly operate or maintain these complex dock levelers. However, attempts to short cut proper operating procedures often lead to injury of either the personnel or the equipment. This, of course, results in the added cost of medical care and replacement parts, as well as the loss in revenue during the "down time" of the loading dock.

An edge-of-dock type dock leveler has been marketed in the past to prevent a forklift truck from running off the loading dock platform at times when the dock leveler is in the stored position. This edge-of-dock leveler includes a lip plate pivotal about the outer edge of a center plate. To form a runoff barrier, the pivot axis for the lip plate is spaced from the rear edge of the lip plate. In this manner, when the dock leveler is moved into its standard stored position, i.e., with the center plate lying flush with the platform and the lip plate extending downward, the rear edge of the lip plate projects vertically above the center plate to prevent the accidental runoff of vehicles from the loading dock platform.

While the runoff barrier feature of this dock leveler has generally proven to be both effective and inexpensive, there remain two situations wherein the runoff barrier may prove to be a burden. The first occurs when actual use of the dock leveler is not required, such that the dock leveler is maintained in its standard stored position and a carrier is backed into a position adjacent the platform. In this instance, the upwardly projecting barrier may impede traffic between the platform and the carrier bed. The second circumstance occurs when the dock leveler is utilized, but the carrier is at such an elevation that the lip plate is not fully extended. Depending upon the angular difference between the center plate and the lip plate, vehicular movement into and out of the storage compartment of the carrier may again be obstructed.

Finally, a growing concern is the susceptibility of loading dock personnel to back strain and other injuries resulting from the operation of dock levelers. If not properly designed, the awkward positioning of an operating lever and the conventional pull-push motion required to extend a manual dock leveler could have harmful effects on an operator. Since the incorporation of hydraulic extenders would add tremendously to the cost of dock levelers, it is desirable to develop an inexpensive manually operated dock leveler which induces minimal back strain on the operator.

SUMMARY OF THE INVENTION

Accordingly, a primary object of this invention is to provide a dock leveler which may operate as a runoff guard for a loading dock platform.

An additional object of this invention is to provide a combination dock leveler and runoff guard which is both inexpensive to make and simple to operate.

Another object of the invention is to provide a combination dock leveler and runoff guard which may be operated without inducing back strain on the operator.

A further object of this invention is to provide a kit for retrofitting a conventional edge-of-dock type dock leveler for operation as a runoff guard.

To achieve the foregoing objects in accordance with the purposes of the invention as embodied and broadly described herein, the dock leveler of the present invention comprises a base plate adapted to be mounted on a loading dock. A center plate is provided having a first edge pivotally connected to the base plate for pivotal movement of the center plate in forward and rearward directions between a forward position and an upright rearward position. Likewise, the dock leveler includes a lip plate pivotally connected to a second edge of the center plate for pivotal movement of the lip plate between a retracted position and an extended position. Locking means is provided for securing the center plate in the upright rearward position to selectively preclude pivotal movement of the center plate.

Preferably, the locking means is adapted to automatically secure pivotal movement of the center plate when the center plate is moved into the upright rearward position. In a preferred embodiment of the present invention, the locking means includes a locking bar having a first end hingedly connected to the bottom surface of the center plate and an opposite second end adapted to move into abutting engagement with a stop member mounted on the base plate when the center plate is moved into the upright rearward position. The preferred embodiment of the locking means further includes an extension member affixed proximate to and axially-extending beyond the second end of the locking bar to prevent the second end of the locking bar from moving past the stop member, as well as means for releasing the locking means.

Also provided in a preferred embodiment of the present invention are center plate pivoting means for pivotally moving the center plate in the forward and rearward directions; actuating means for selectively operating the center plate pivoting means; and lip plate extension means for pivoting the lip plate toward the extended position as the center plate is pivoted in the forward direction from the upright rearward position. Preferably, the releasing means is adapted to automatically release the locking means when the center plate pivoting means is operated to pivot the center plate in the forward direction from the upright rearward position.

In a preferred embodiment of the present invention, the center plate pivoting means includes a mechanical linkage extending between the base plate and the bottom surface of the center plate, and the actuating means includes a manually-operable lever arm operatively connected to the mechanical linkage. The releasing means of the preferred embodiment includes a first paddle pivotally mounted on the bottom surface of the center plate and engageably-aligned with the mechanical linkage, a second paddle pivotally mounted on the bottom surface of the center plate and engageably-aligned with the locking bar, a connecting rod extending between the first and second paddles to enable coordinated movement therebetween, and means for biasing the second paddle away from the locking bar at times when the first paddle is not in engagement with the mechanical linkage.

The accompanying drawings, which are incorporated in and constitute a part of this specification, illustrate one embodiment of the invention and together with the description serve to explain the principles of this invention.

DESCRIPTION OF THE PREFERRED EMBODIMENTS

Reference will now be made in detail to the preferred embodiment of the present invention, an example of which is illustrated in the accompanying drawings. Wherever possible, the same reference numbers will be used throughout the drawings to refer to the same or like parts.

In accordance with the present invention, the dock leveler is operable as a runoff guard for a loading dock platform. During standard operation, the dock leveler may be positioned to bridge the gap and compensate for height variations between the loading dock platform and an adjacent carrier bed. When a carrier is not located next to the loading dock, however, the dock leveler may be positioned to guard against the accidental runoff of vehicles from the edge of the loading dock platform. To facilitate both functions, the dock leveler is adapted to be mounted on the edge of a loading dock platform.

Accordingly, the dock leveler of the present invention includes a base plate adapted to be mounted on the loading dock. As embodied herein, and with initial reference to FIG. 2, the dock leveler of the present invention, generally designated by reference character 10, is mounted on the exposed vertical face 102 of the loading dock 100 utilizing the base plate 12. Of course, it is likewise feasible that the dock leveler may be adapted to be mounted to the horizontal surface of the loading dock platform 104 itself, proximate the outer edge, if so desired.

Figure 2:
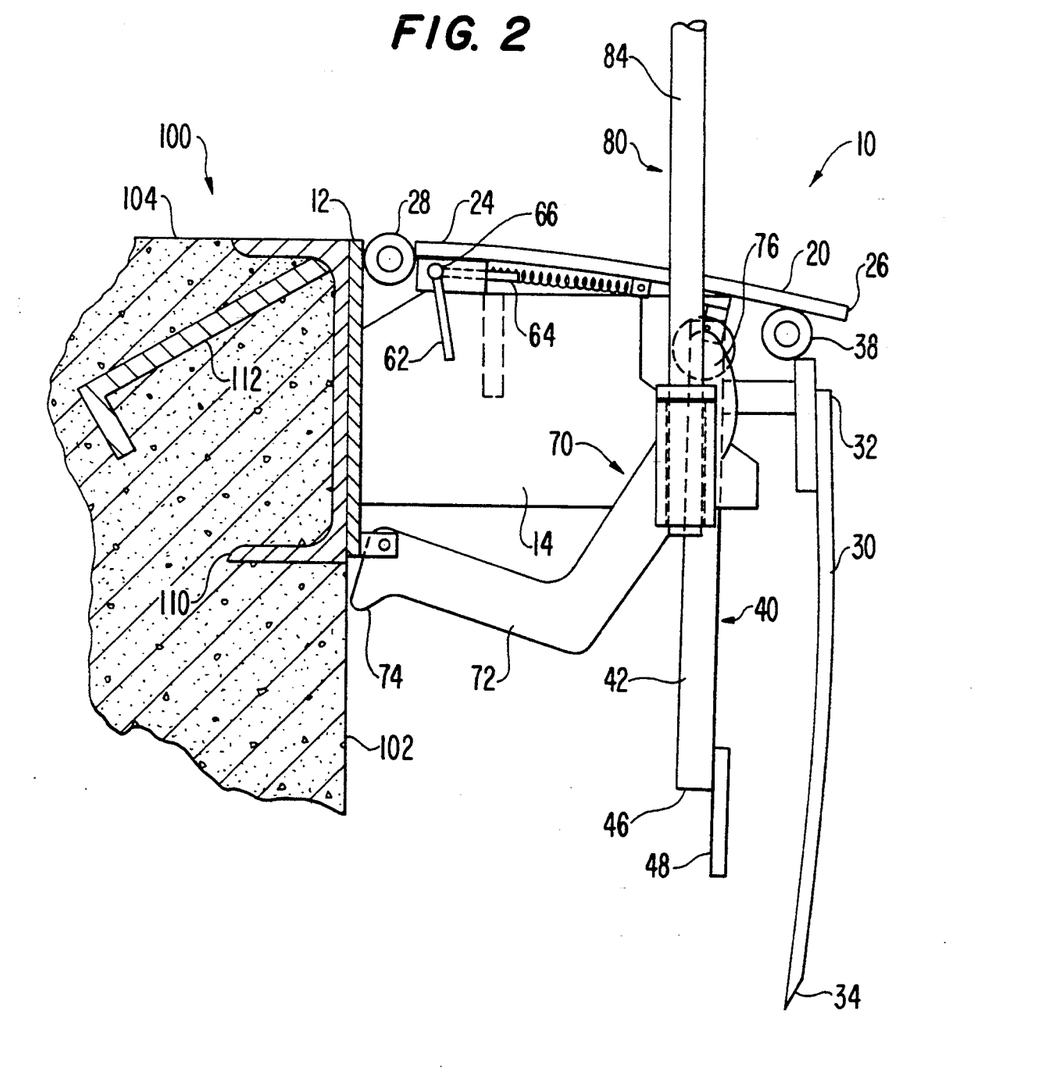
FIG. 2 is a side view illustrating the dock leveler shown in FIG. 1 in a standard stored position.

In the preferred embodiment of the dock leveler 10, the base plate 12 is secured to the loading dock 100 by a dock edge channel iron 110 and anchor 112. Typically, the loading dock 100 is of concrete construction, with the dock edge channel iron 110 and anchor 112 embedded therein. However, it is also possible to make base plate 12 integral with the dock edge channel iron 110 by using the face of the dock edge channel iron 110 as the base plate 12. Bumper blocks (not shown) are positioned on either side of the base plate 12 to prevent trucks from backing into the loading dock 100.

Figure 3A:
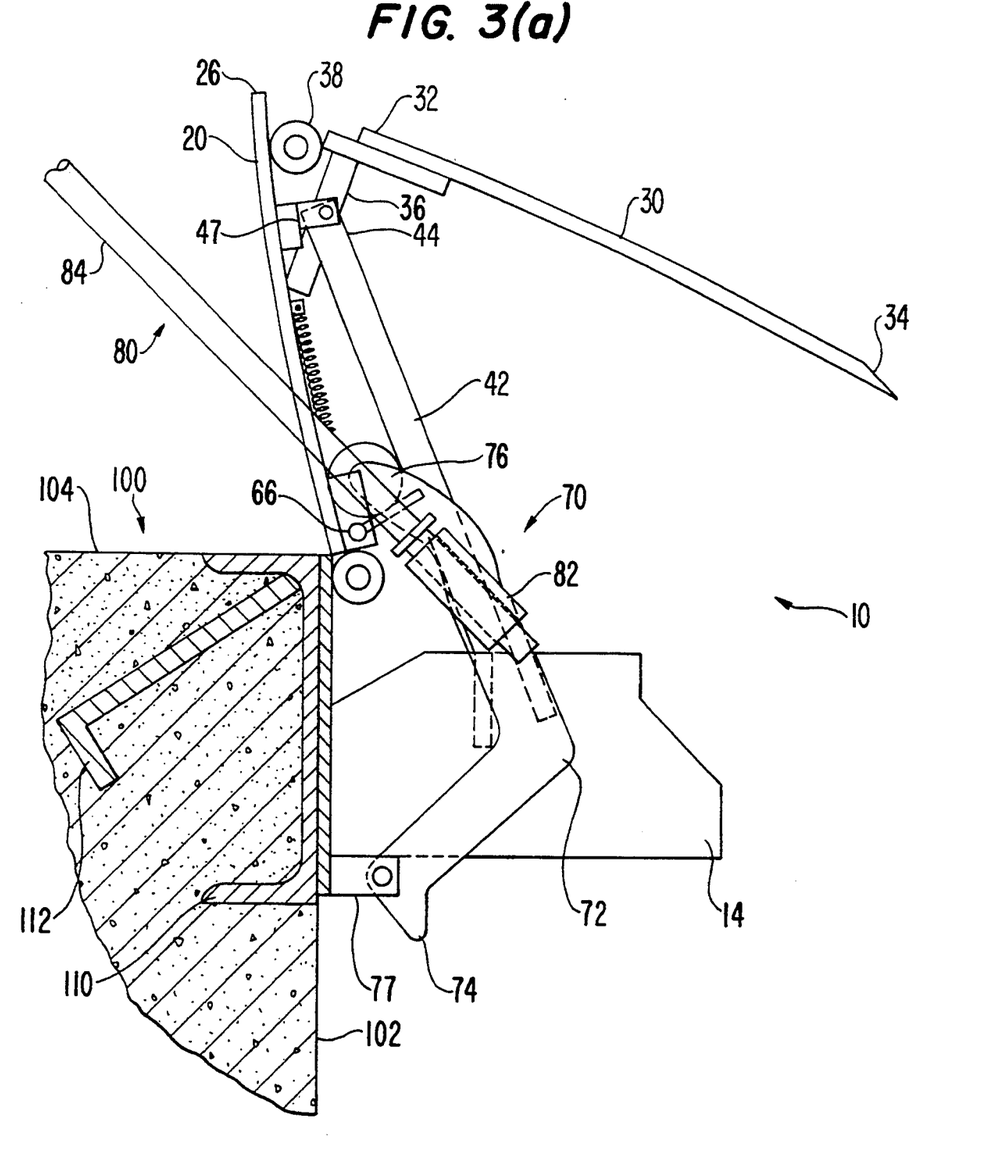
FIG. 3(a) is a side view taken along line 3—3 of FIG. 1, with the dock leveler operable as a runoff guard when the center plate is locked in its upright rearward position and the lip plate is in its retracted position.

The dock leveler made in accordance with the present invention includes a center plate having a bottom surface and opposite first and second edges. The first edge of the center plate is pivotally connected to the base plate for pivotal movement of the center plate in forward and rearward directions between a forward position and an upright rearward position. As embodied herein, FIG. 2 shows the center plate 20 in its forward position, with the center plate 20 being substantially horizontal and lying flush with the loading dock platform 104. FIG. 3(a) shows the upright rearward position, with the center plate 20 in a substantially vertical position relative the loading dock platform 104. Typically, center plate 20 is approximately 25° past perpendicular to the plane of loading dock platform 104.

In a preferred embodiment, the pivotal connection between the base plate 12 and the first edge 24 of the center plate 20 is provided by a conventional pin-type hinge 28. Preferably, the center plate 20 has substantially planar top and bottom surfaces, and is either rectangular or trapezoidal in shape, with the second edge 26 being parallel to the first edge 24. To support the center plate 20 in its substantially-horizontally forward position, at least one support gusset 14 is mounted on and extends from the base plate 12. It is preferred, however, that support gussets 14 be positioned at either side of the center plate 20 to provide a more stable structure.

Figure 5:
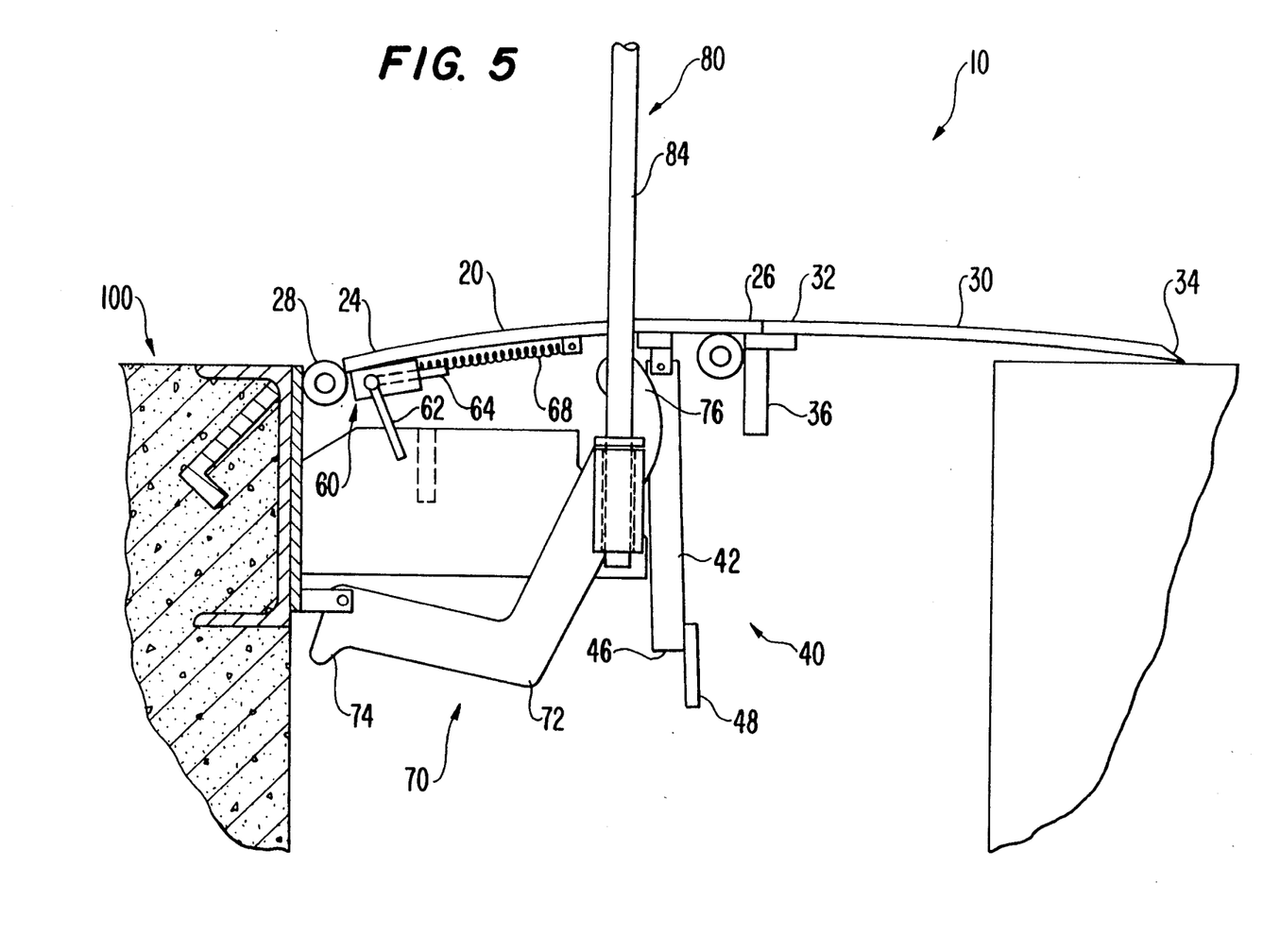
FIG. 5 is a side view illustrating the dock leveler of FIG. 1 in a bridging position.

Further in accordance with the present invention, the dock leveler includes a lip plate having opposite first and second edges. The first edge of the lip plate is pivotally connected to the second edge of the center plate for pivotal movement of the lip plate between a retracted position and an extended position. More specifically, and as embodied herein, the lip plate 30 of the present invention is pivotal about the second edge 26 of the center plate 20 between a retracted position, as seen in FIG. 3(a), with the lip plate 30 generally forming an acute angle with the center plate 20 when the dock leveler 10 is in its upright rearward position; an intermediate position, as seen in FIG. 2, with the lip plate 30 generally forming a right-angle with the center plate 20 when the dock leveler 10 is in its standard stored position; and an extended position, as seen in FIG. 5, with the lip plate 30 generally coplanar with and forming an extension of the center plate 20 when the dock leveler 10 is in its bridging position.

As with the center plate 20, it is preferred that the pivotal connection between the center plate 20 and the lip plate 30 be provided by a conventional pin-type hinge 38; and that the lip plate 30 have a substantially planar, rectangular construction. While any of a variety of rigid, durable materials may be used for construction, it is preferable to form the center plate 20 and lip plate 30 from steel or a similar metal material.

Unlike the pivotal connection for the center plate 20, however, the hinge pin of the preferred pivotal connection for the lip plate 30 of the present invention extends outwardly beyond the side of the hinge 38. Preferably, the hinge pin extension 39 has an outer diameter of approximately 1 and ¼ inches and extends outwardly from the hinge by approximately 2 inches. Such hinge pin extensions are common in conventional edge-of-dock type dock levelers. The hinge pin extension is often utilized as a structure onto which an operator can latch a hook for pivoting a conventional dock leveler in the rearward direction. Alternatively, a rivet of similar dimensions may simply be welded to the bottom surface of the center plate, proximate the second edge of the center plate, to provide such a structure.

Preferably, a support bar 36 is attached to the underside of the lip plate 30, as best seen in FIG. 3(a), to ensure the lip plate 30 does not retract toward the center plate 20 beyond a predetermined acute angle. In this manner, the support bar 36 engages the bottom surface 22 of the center plate 20 when center plate 20 is pivoted into the upright rearward position. By maintaining a predetermined angle between the lip plate 30 and the center plate 20, the second edge 36 of the lip plate 30 is elevated to reach carrier beds which are higher than the loading dock 100 so as to greatly enhance the service range of the dock leveler 10.

In accordance with the present invention, the dock leveler also includes locking means for securing the center plate in the upright rearward position to selectively preclude pivotal movement of the center plate. The locking means enables the dock leveler to operate as a runoff guard when the dock leveler is not being utilized to obtain access to an adjacent carrier. By providing durable locking means to securely maintain the center plate in its upright rearward position, the sturdy construction of the center plate acts as a barrier to prevent vehicles from accidentally being driven beyond the edge of the loading dock. It should be noted that in accordance with the present invention, any of a wide variety of locking means may be incorporated to secure the center plate in the upright rearward position. However, the locking means selected should be capable of withstanding direct impact upon the center plate, such as by a forklift truck. This ensures that the dock leveler will not inadvertently pivot forward due to a slight bump, thus rendering the runoff guard ineffective.

As embodied herein, the locking means of the present invention is adapted to automatically secure pivotal movement of the center plate when the center plate is moved into the upright rearward position. That is, no additional or secondary action is required to activate the runoff guard once the center plate is brought into its upright rearward position. This eliminates the possibility of any operator error in securing the locking means.

A preferred embodiment of the present invention, as shown in the accompanying drawings by means of illustration and not limitation, includes a stop member 50 attached to the base plate 12. The stop member 50 of the preferred embodiment includes at least one gusset plate 52 extending from the base plate 12, and a stop plate 54 affixed to and extending from the at least one gusset plate 52.

The locking means 40 of the preferred embodiment includes a locking bar 42 having a first end 44 hingedly connected to the bottom surface 22 of the center plate 20 and an opposite second end 46 adapted to move into abutting engagement with the stop member 50 when the center plate 20 is moved into the upright rearward position to brace the center plate 20 against subsequent pivotal movement in the forward direction.

More specifically, the first end 44 of the locking bar 42 is connected to the bottom surface 22 of the center plate 20 by a hinge block 47, and the second end 46 of the locking bar 42 is adapted to swing freely as the center plate 20 is pivoted between its forward position and its upright rearward position. This is best demonstrated by FIGS. 2 and 4(a). As the center plate 20 is pivoted in the rearward direction, i.e. toward the left in the representation of FIGS. 2-5, the second end 46 of the locking bar 42 swings toward the bottom surface 22 of the center plate 20. The stop member 50 is located such that, when the upright rearward position is reached, the second end 46 of the locking bar 42 is positioned adjacent to and in abutting engagement with the stop member 50. As is evident in FIG. 4(a), any forces exerted on the center plate 20 in the forward direction, i.e. accidental impacting by a vehicle, are counteracted by the bracing effect of the locking bar 42.

Figure 4A:
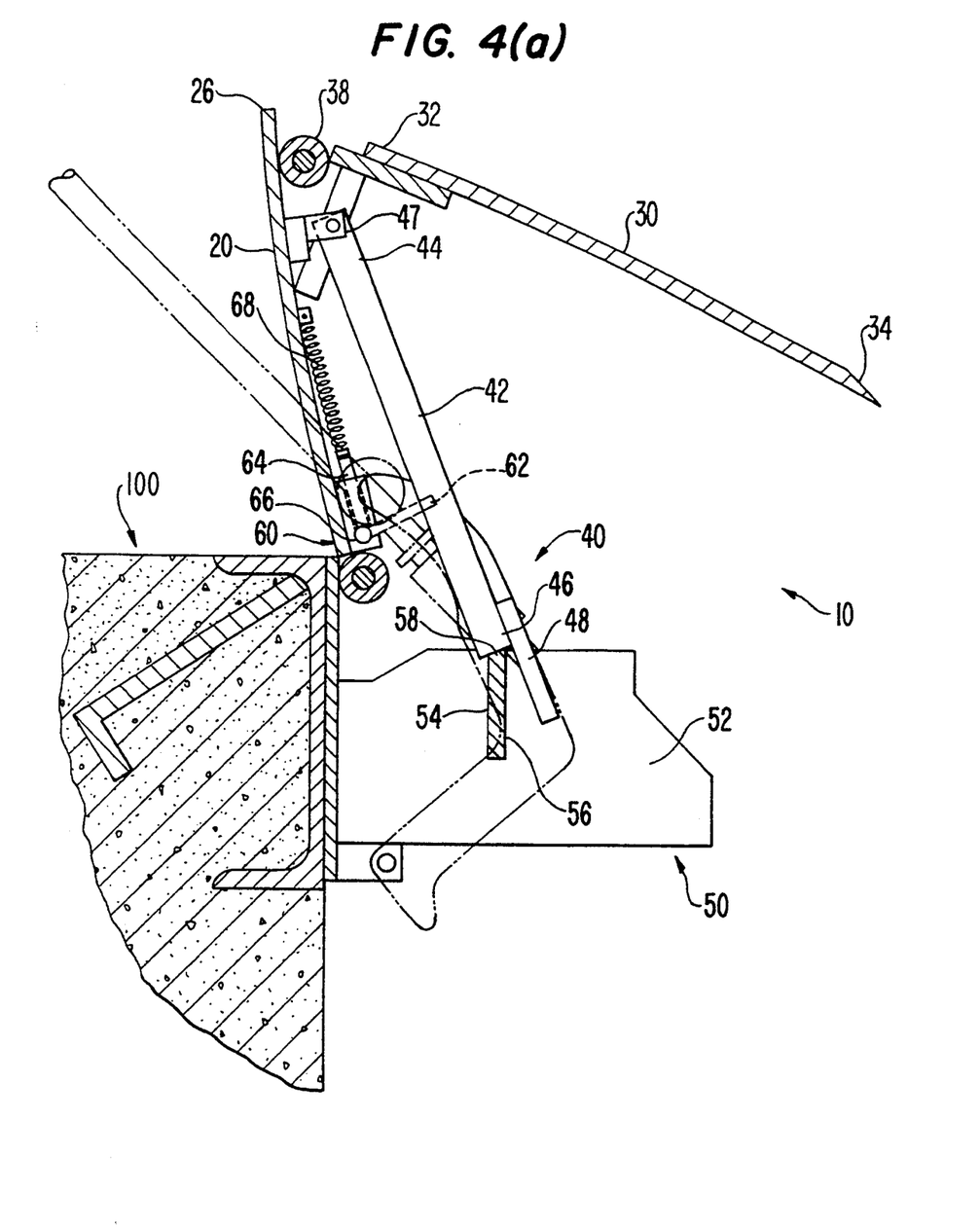
FIG. 4(a) is a sectional side view taken along line 4—4 of FIG. 1, with the dock leveler operable as a runoff guard when the center plate is locked in its upright rearward position and the lip plate is in its retracted position.

In the preferred embodiment of the present invention, the locking bar 42 includes an extension member 48 affixed proximate to and axially-extending beyond its second end 46. As best seen in FIG. 4(a), the extension member 48 ensures the second end 46 of the locking bar 42 is properly positioned in abutting engagement with the stop member 50 when the center plate 20 is pivoted into the upright rearward position. This is accomplished by effectively preventing the second end 46 of the locking bar 42 from moving past the stop member 50. The drawings present the extension member 48 as a separate element, such as a rod, welded to the locking bar 42. Of course, the extension member 48 may likewise be formed as an integral extension of the locking bar 42, if so desired.

As seen in FIG. 4(a), the stop plate 54 has a forward edge 56 against which the extension member 48 contacts to prevent the locking bar 42 from moving past the stop member 50 and an upper surface 58 against which the second end 46 of the locking bar 42 abuttingly engages. While the drawings present the stop plate 54 as being vertically-aligned, it is noted that the stop plate 54 may be angled so as to be axially aligned with the locking bar 42 for more flush contact therebetween.

Of course it should be understood that the locking bar assembly above is but one possible embodiment of automatic locking means. For example, and purely for illustrative purpose, a post with a latching mechanism proximate its upper end may be mounted on the base plate adjacent the center plate. As such, the latching mechanism may be adapted to securely engage the hinge pin extension when the center plate is pivoted into the upright rearward position. Alternatively, an air-operated piston pin may be mounted on the bottom surface of the center plate, and adapted to engage an aperture formed in an adjacent post.

The dock leveler embodied herein further includes means for selectively releasing the locking means. Of course, the releasing means selected will be dependent upon the type of locking means utilized. For example, with the locking bar of the preferred embodiment, the preferred releasing means is connected to the center plate and adapted to selectively move the second end of the locking bar out of abutting engagement with the stop member to permit subsequent pivotal movement of the center plate in the forward direction, as will be described in detail below. Likewise, the releasing means selected will be dependent upon the extent of operator interaction desired. If maximum security is desired, the releasing means may be independently operated to ensure that no movement of the center plate is possible without the operator first consciously releasing the locking means. Alternatively, and as will be discussed below, the releasing means may be adapted to automatically release the locking means when normal dock leveler positioning procedures are performed.

As embodied herein, the dock leveler of the present invention includes center plate pivoting means connected to the base plate for pivotally moving the center plate in the forward or rearward directions, and actuating means for selectively operating the center plate pivoting means. A variety of center plate pivoting means are available and adapted for use with dock levelers. In the preferred embodiment of the present invention, the center plate pivoting means of the type originally presented in copending U.S. patent application Ser. No. 07/645,609 filed Jan. 25, 1991 is utilized.

A more detailed disclosure of the center plate pivoting means is set forth in the specification of U.S. patent application Ser. No. 07/645,609, as incorporated herein. Generally, however, the preferred center plate pivoting means includes a mechanical linkage extending between the base plate and the bottom surface of the center plate. The mechanical linkage has a first end hingedly connected to the base plate, and a second end is selectively disengageable from the bottom surface of the center plate when the mechanical linkage is operated to pivot the center plate in the forward direction, as discussed below.

Figure 3B:
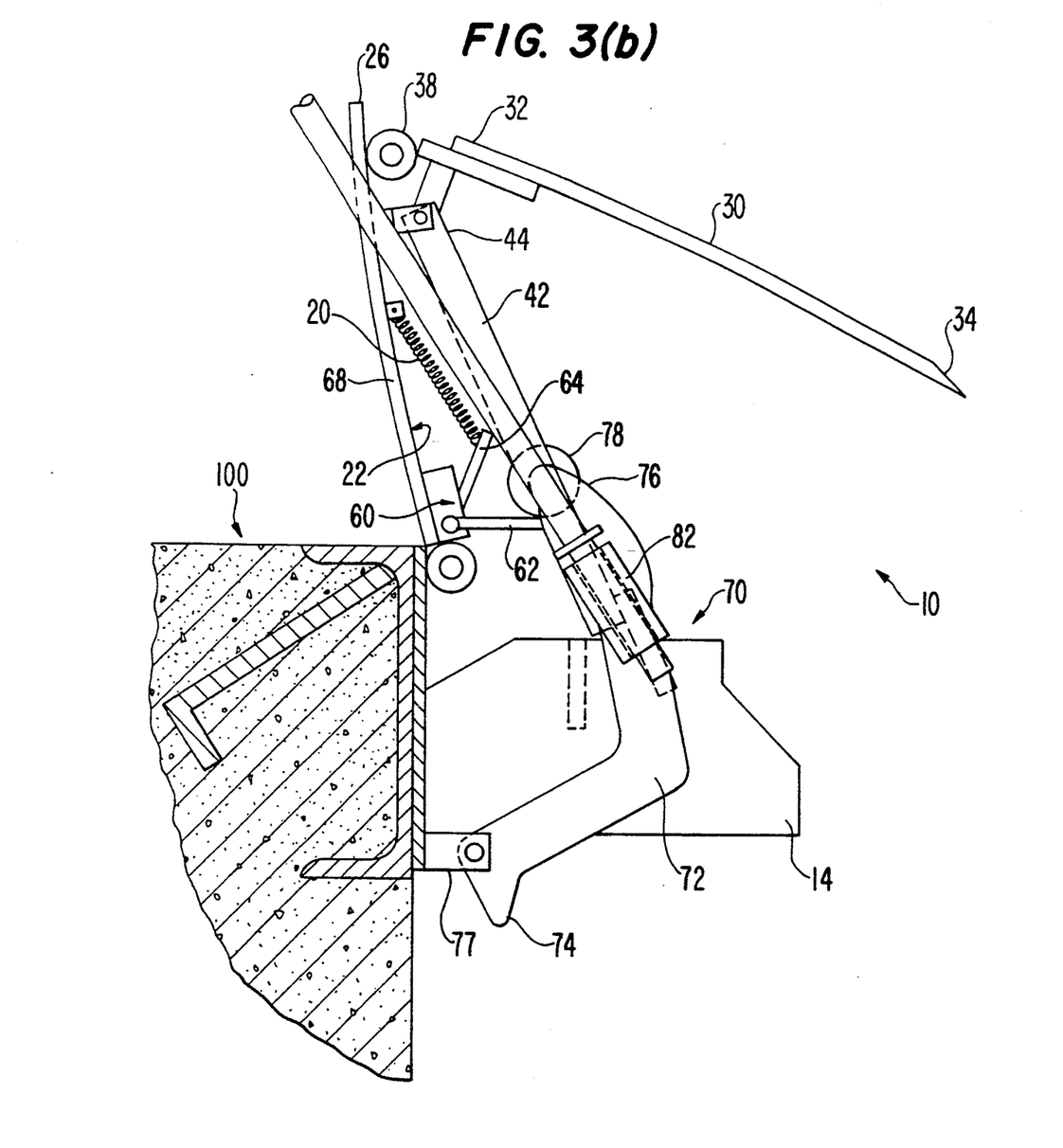
FIG. 3(b) is a side view taken along line 3—3 of FIG. 1, as the locking apparatus is released and the dock leveler is moved in the forward direction from the upright rearward position of FIG. 3(a)

The actuating means 80 embodied herein includes a manually-operable lever arm 84 operatively connected to the mechanical linkage 72. In the preferred embodiment, as best seen in Figs. 3(a) and 3(b), a lever tube 82 is connected proximate the second end 76 of the mechanical linkage 72, and the manually-operable lever arm 84 is removably disposed in the lever tube 82. Preferably, the lever arm 84 is configured to be in a substantially vertical orientation when the center plate 20 is in the forward position, as seen in FIG. 2. This allows the operator to grasp and pull the lever arm 84 rearward without undue back strain and without having to lean over the edge of the loading dock 100. Likewise, when the center plate 20 is in the upright rearward position, the lever arm 84 is adapted to extend approximately 18-24 inches above the ground. This minimizes the amount of bending required by an operator to grasp the lever arm 84 and move the dock leveler 10 in the forward direction.

As demonstrated by FIGS. 2 and 3(a), the first end 74 is connected to the base plate 12 by a pivot block 77. The second end 76 is adapted to selectively engage and travel along the bottom surface 22 of the center plate 20 when the center plate pivoting means 70 is operated to move the center plate 20 in the rearward direction. In this manner, the normal force exerted by the second end 76 of the mechanical linkage 72 against the bottom surface 22 of the center plate 20 pivots the center plate 20 in the rearward direction. Preferably, the second end 76 of the mechanical linkage 72 includes a roller 78 adapted to roll against the bottom surface 22 of the center plate 20 to reduce drag as the second end 76 of the mechanical linkage 72 moves along the bottom surface 22 of center plate 20. When the lever arm 84 is pushed in the forward direction for pivotal movement of the center plate 20 in the forward direction, the second end 76 of the mechanical linkage 72 disengages from the bottom surface 22 of the center plate 20. As seen in FIG. 3(b), the lever arm 84 then engages the hinge pin extension 39 to urge the center plate 20 in the forward direction. FIGS. 2 and 5 show that the second end 76 of the mechanical linkage 72 is also disengaged from bottom surface 22 of the center plate 20 when center plate 20 is at rest in the forward position.

Figure 1:
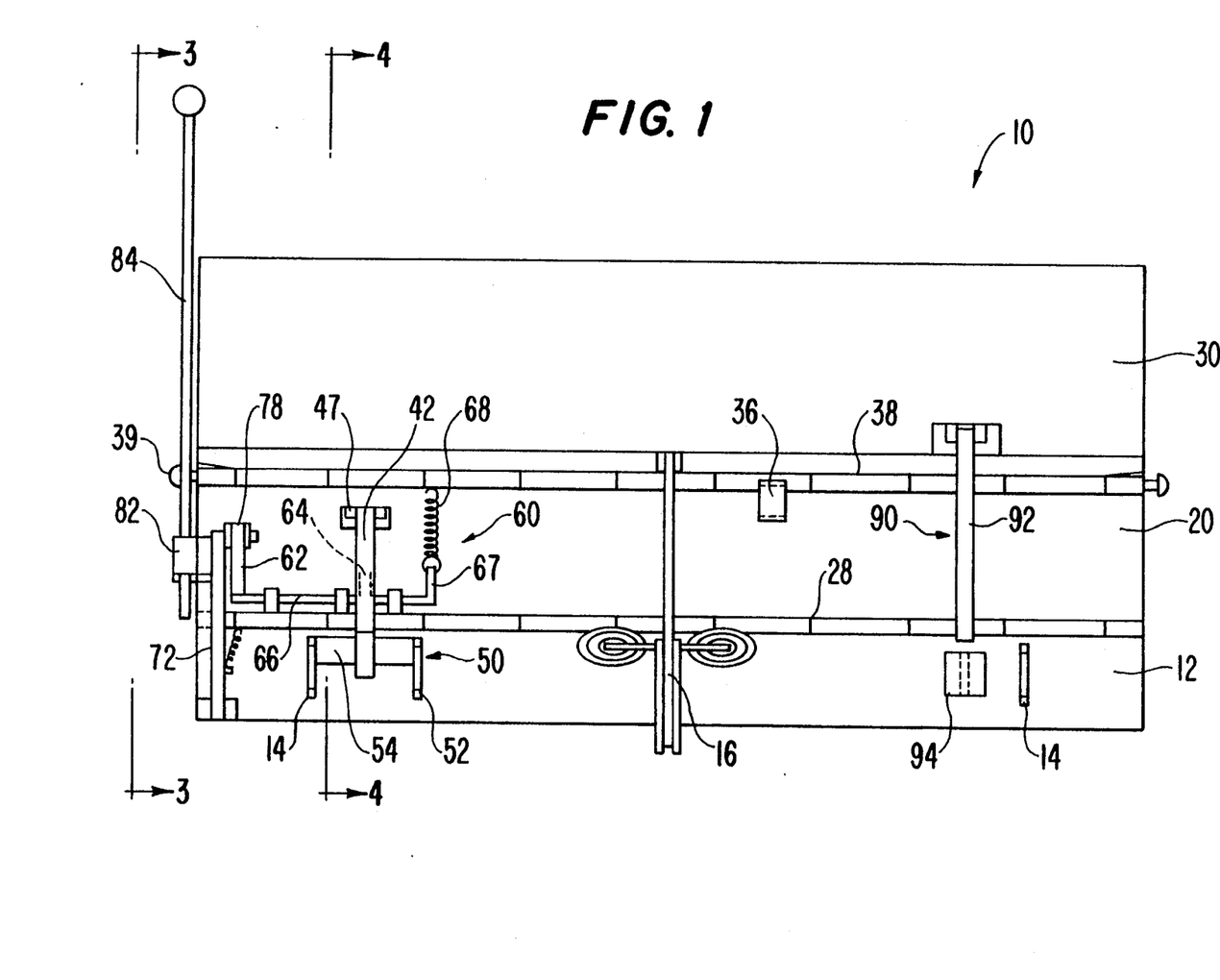
FIG. 1 is a front plan view of a dock leveler made in accordance with the present invention, extended into a fully-opened upright position.

The preferred embodiment of the present invention includes a counterbalance spring mechanism 16, as shown in FIG. 1, to reduce the effort required to position the dock leveler 10. The counterbalance spring mechanism 16 is adapted to exert an upward force on the center plate 20 and lip plate 30. The counterbalance spring mechanism 16 of the preferred embodiment is a dual extension spring mechanism, which is well known in the art. Accordingly, the details of counterbalance spring mechanism need not be further described.

As previously mentioned and embodied herein, the releasing means of the present invention is adapted to automatically release the locking means when the center plate pivoting means is operated to pivot the center plate in the forward direction from the upright rearward position. In the preferred embodiment of the present invention, the releasing means 60 is operatively disposed between the locking means 40 and the center plate pivoting means 70. For simplicity of design, the releasing means 60 is preferably adapted to move the second end 46 of the locking bar 42 out of abutting engagement with the stop member 50 as the second end 76 of the mechanical linkage 72 disengages from the bottom surface 22 of the center plate 20. To provide this operative relationship, a variety of releasing mechanisms may be incorporated, such as linkage arms or cables. In fact, computer-synchronized hydraulic pistons could even be utilized, cost permitting, to operate the center plate pivoting means and releasing means.

The preferred embodiment of the releasing means 60, however, comprises a pair of interconnected paddles, as seen in FIG. 1. A first paddle 62 is pivotally mounted on the bottom surface 22 of the center plate 20 and engageably-aligned with the second end 76 of the mechanical linkage 72, as best viewed in FIGS. 3(a) and 3(b). A second paddle 64 is pivotally mounted on the bottom surface 22 of the center plate 20 and engageably-aligned with the locking bar 42, as best viewed in FIGS. 4(a) and 4(b). Extending between the first and second paddles, 62 and 64, respectively, is a connecting rod 66 to enable coordinated movement of the two paddles. With the center plate 20 locked in its upright rearward position by the bracing effect of the locking bar 42, as seen in FIG. 4(a), the first paddle 62 extends outwardly from the bottom surface 22 of the center plate 20, and the second paddle 64 lies substantially parallel to the bottom surface 22.

Figure 4B:
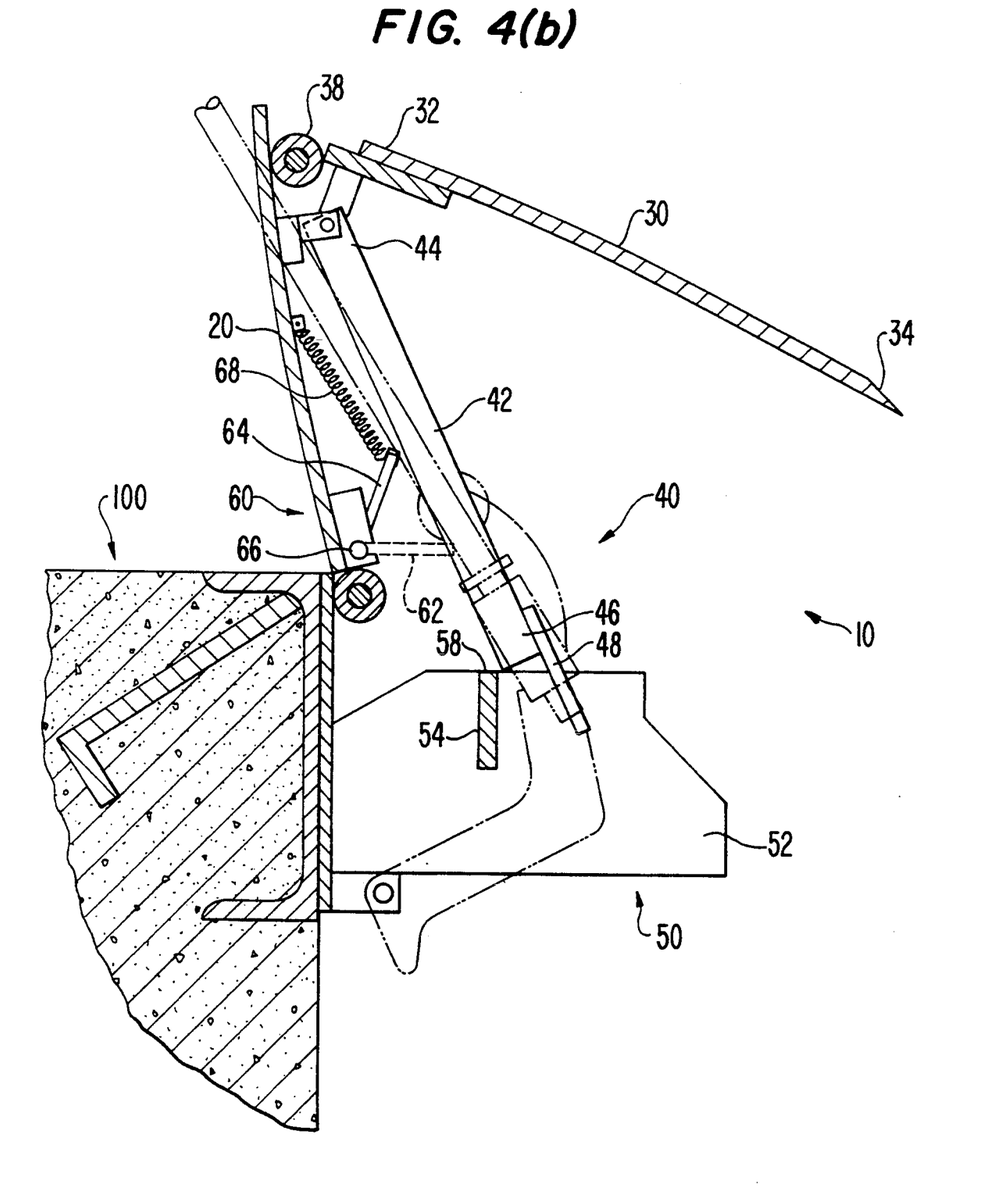
FIG. 4(b) is a sectional side view taken along line 4—4 of FIG. 1, as the locking apparatus is released and the dock leveler is moved in the forward direction from the upright rearward of position FIG. 4(a)

To release the locking means 40, and permit subsequent forward movement of the center plate 20, the lever arm 84 is moved in the forward direction to operate the center plate pivoting means 70. As a result of the forward movement of the lever arm 84, and as best seen in FIGS. 3(a) and 3(b), the second end 76 of the mechanical linkage 72 disengages from the bottom surface 22 and engages the first paddle 62. Further forward movement of the lever arm 84 causes the second end 76 of the mechanical linkage 72 to pivot the first paddle 62 in the clockwise direction, as viewed in FIG. 3(a). Due to the coordinated movement enabled by the connecting bar 66, the second paddle 64 simultaneously pivots away from the bottom surface 22 and engages the locking bar 42, as seen in FIG. 4(b). In this manner, the second paddle 64 urges the second end 46 of the locking bar 42 out of abutting engagement with the stop member 50 to permit pivotal movement of the center plate 20 in the forward direction when the lever arm 84 engages the hinge pin extension 39.

After the locking means 40 is released, it is desirable to reset the releasing means 60 for future use. The preferred embodiment of the releasing means 60 includes means for biasing the second paddle 64 away from the locking bar 42 when the first paddle 62 is not in engagement with the second end 76 of the mechanical linkage 72. Preferably, the biasing means is a spring 68 extending between the bottom surface 22 of the center plate 20 and an extension 67 of the connecting rod 66, as seen in FIG. 1.

Adapting the releasing means 60 to automatically release the locking means 40 simplifies operation of the dock leveler 10, while still providing the benefit of a runoff guard when the dock leveler 10 is not being utilized to obtain access to an adjacent carrier. To prevent the inadvertent operation of the releasing means 60 or the center plate pivoting means 70 when the dock leveler 10 is not in use, the lever arm 84 of the preferred embodiment is removably connected to the mechanical linkage 72 by the lever tube 82 discussed above. As such, and with the dock leveler 10 locked in its upright rearward position, the lever arm 84 may be removed and stored in a convenient location for future use.

The dock leveler embodied herein preferably includes lip plate extension means mounted on the lip plate for pivoting the lip plate toward the extended position as the center plate is pivoted in the forward direction from the upright rearward position. While a variety of lip plate extension means are available, the preferred embodiment of the lip plate extension means is of the type originally presented in U.S. patent application Ser. No. 07/645,609.

The lip plate extension means 90 of the preferred embodiment includes an extension bar 92 and a stop member 94. It should be noted that these elements are only shown in FIG. 1, for clarity, since a more detailed disclosure of the lip plate extension means 90 is provided in U.S. patent application Ser. No. 07/645,609. Generally, however, the extension bar 92 has a first end pivotably connected to lip plate 30 and a freely swinging second end. The extension bar 92 is adapted to engage the stop member 94 when the center plate 20 is in the upright rearward position, and to pivot the lip plate 30 toward the extended position when the center plate 20 is pivoted forward from the upright rearward position. Preferably, the stop member 94 is angled, such that the extension bar 92 disengages from the stop member 94 in a searing action when the center plate 20 reaches a predetermined pivotal position.

The overall operation of the apparatus of the present invention will now be described with reference to the drawings. FIG. 2 illustrates the dock leveler 10 in a standard stored position with the second end 76 of the mechanical linkage 72 disengaged from center plate 20. To move the dock leveler 10 into its upright rearward position, an operator inserts the lever arm 84 into the lever tube 82 and pulls the lever arm 84 in a rearward direction. The rearward movement of the lever arm 84 causes the second end 76 of the mechanical linkage 72 to engage the bottom surface 22 of the center plate 20 proximate the second edge 26. As the rearward movement of the lever arm 84 is continued, the second end 76 of the mechanical linkage 72 rides down the center plate 20 toward the first edge 24 and the center plate 20 pivots into its upright rearward position, as shown in FIG. 3(a). It is noted that the lip plate 30 simultaneously pivots rearwardly into its predetermined retracted position.

Similarly, the second end 46 of the locking bar 42 swings toward the bottom surface 22 of the center plate 20 as the center plate 20 is pivoted in the rearward direction. As the center plate 20 reaches the upright rearward position, the second end 46 of the locking bar 42 swings into abutting engagement with the stop member 50 and the extension member 48 contacts the forward edge 56 of the stop member 50 to prevent overswinging of the locking bar 42. At this point, the center plate 20 is effectively braced against pivotal movement in the forward direction, such that the dock leveler 10 may operate as a runoff guard. If desired, the manually-operable lever arm 84 may then be removed from the lever tube 82 to ensure the locking means 40 is not inadvertently released.

If, however, it is desired to move the dock leveler 10 from the upright rearward position shown in FIG. 3(a) to either the bridging position of FIG. 5 or standard stored position of FIG. 2, the operator simply pushes forward on the lever arm 84. The forward movement of the lever arm 84 initially causes the second end 76 of the mechanical linkage 72 to disengage from center plate 20 and engage the first paddle 62. Continued forward movement of the lever arm 84 pivots the first paddle 62 of the releasing means 60, which simultaneously pivots the second paddle 64 into engagement with the locking bar 42, as seen in FIG. 4(b). The locking bar 42 subsequently swings out of abutting engagement with the stop member 50, and the lever arm 84 engages the outward extension of the hinge pin to pivot the center plate 20 in the forward direction. Once the second end 76 of the mechanical linkage 72 disengages from the first paddle 72, the biasing means 68 returns the two paddles to their initial positions. The lip plate extension means 90 extends the lip plate 30 as the center plate 20 pivots in the forward direction such that the lip plate 30 may either engage an adjacent carrier bed, as seen in FIG. 5, or return to its intermediate, standard stored position, as seen in FIG. 2.

It should be understood that a kit may likewise be provided for retrofitting a conventional dock leveler having a center plate and a lip plate to enable the conventional dock leveler to operate as a runoff guard. In accordance with the present invention, the kit includes the locking means and releasing means described in detail above. As embodied herein, the kit may further include the preferred center plate pivoting means and lip plate extension means, if desired. The kit of the present invention simply need be attached to a dock leveler having a center plate and a lip plate to provide the benefits of a runoff guard which may be operated without inducing back strain on the operator.

It is envisioned that a runoff guard may be configured to preclude access to the edge of the loading dock platform, or even the dock leveler itself. Such a runoff guard configuration would not be dependent upon the operation of the dock leveler. Examples of embodiments of this alternative runoff guard may include, but are not limited to, a retractable chain or cable adapted to be extended a predetermined distance above the exposed edge of the loading dock platform, or a gate-like assembly which may be raised or lowered to selectively permit or obstruct access to the exposed edge.

It will be apparent to those skilled in the art that various modifications and variations can be made in the dock leveler operating apparatus and kit of present invention without departing from the scope or spirit of the present invention. Thus, it is intended that the present invention covers the modifications and variations of the invention which come within the scope of the appended claims and their equivalents.

What is claimed is:

1. A dock leveler operable as a runoff guard for a loading dock, the dock leveler comprising:

a base plate adapted to be mounted on the loading dock;

a center plate having a bottom surface and opposite first and second edges, said first edge of the center plate being pivotally connected to the base plate for pivotal movement of the center plate in forward and rearward directions between a forward position and an upright rearward position;

a lip plate having opposite first and second edges, said first edge of the lip plate being pivotally connected to said second edge of the center plate for pivotal movement of the lip plate between a retracted position and an extended position;

a stop member attached to the base plate;

locking means for securing the center plate in the upright rearward position to selectively preclude pivotal movement of the center plate, wherein the locking means is adapted to automatically secure pivotal movement of the center plate when the center plate is moved into the upright rearward position, the locking means including a locking bar having a first end hingedly connected to the bottom surface of the center plate and an opposite second end adapted to move into abutting engagement with the stop member when the center plate is moved into the upright rearward position to brace the center plate against subsequent pivotal movement in the forward direction; and means for selectively releasing the locking means, the releasing means being connected to the center plate and adapted to selectively move said second end of the locking bar out of abutting engagement with the stop member to permit subsequent pivotal movement of the center plate in the forward direction.

2. A dock leveler operable as a runoff guard for a loading dock, the dock leveler comprising:

a base plate adapted to be mounted on the loading dock;

a center plate having a bottom surface and opposite first and second edges, said first edge of the center plate being pivotally connected to the base plate for pivotal movement of the center plate in forward and rearward directions between a forward position and an upright rearward position;

a lip plate having opposite first and second edges, said first edge of the lip plate being pivotally connected to said second edge of the center plate for pivotal movement of the lip plate between a retracted position and an extended position;

locking means for securing the center plate in the upright rearward position to selectively preclude pivotal movement of the center plate, wherein the locking means is adapted to automatically secure pivotal movement of the center plate when the center plate is moved into the upright rearward position;

center plate pivoting means connected to the base plate for pivotally moving the center plate in the forward or rearward directions, the center plate pivoting means including actuating means for selectively operating the center plate pivoting means; and means for automatically releasing the locking means when the center plate pivoting means is selectively operated by the actuating means to pivot the center plate in the forward direction from the upright rearward position.

3. The dock leveler of claim 2 further comprising a stop member attached to the base plate; wherein the locking means includes a locking bar having a first end hingedly connected to the bottom surface of the center plate and an opposite second end adapted to move into abutting engagement with the stop member when the center plate is moved into the upright rearward position to brace the center plate against subsequent pivotal movement in the forward direction.

4. The dock leveler of claim 3, wherein the center plate pivoting means includes a mechanical linkage extending between the base plate and the bottom surface of the center plate, and the actuating means includes a manually-operable lever arm operatively connected to the mechanical linkage;

and further wherein the releasing means is operatively disposed between the locking bar and the mechanical linkage to move said second end of the locking bar out of abutting engagement with the stop member when the mechanical linkage is operated the pivot the center plate in the forward direction from the upright rearward position.

5. The dock leveler of claim 4, wherein the mechanical linkage has a first end hingedly connected to the base plate and a second end selectively disengageable from the bottom surface of the center plate when the mechanical linkage is operated to pivot the center plate in the forward direction, the releasing means operatively engageable with said second end of the mechanical linkage.

6. The dock leveler of claim 5, wherein the releasing means includes a first paddle pivotally mounted on the bottom surface of the center plate and engageably-aligned with said second end of the mechanical linkage, a second paddle pivotally mounted on the bottom surface of the center plate and engageably-aligned with the locking bar, and a connecting rod extending between the first and second paddles to enable coordinated movement therebetween.

7. The dock leveler of claims 6, wherein the releasing means further includes means for biasing the second paddle away from the locking bar at times when the first paddle is not in engagement with said second end of the mechanical linkage.

8. The dock leveler of claim 4, wherein the lever arm is removably connected to the mechanical linkage to prevent inadvertent operation of the releasing means or the center plate pivoting means.

9. The dock leveler of claim 4 further comprising:
lip plate extension means mounted on the lip plate for pivoting the lip plate toward the extended position as the center plate is pivoted in the forward direction from the upright rearward position.

10. A kit for retrofitting a dock leveler for operating the dock leveler as a runoff guard, the dock leveler having a base plate adapted to be mounted on a loading dock, a center plate having a bottom surface and opposite first and second edges, the first edge of the center plate being pivotally connected to the base plate for pivotal movement of the center plate in forward and rearward directions between a forward position and an upright rearward position, and a lip plate having opposite first and second edges, the first edge of the lip plate being pivotally connected to the second edge of the center plate for pivotal movement of the lip plate between a retracted position and an extended position, the kit comprising:

a stop men, her adapted to be attached to the base plate;

locking means for securing the center plate in the upright rearward position to selectively preclude pivotal movement of the center plate, the locking means including a locking bar having a first end adapted to be hingedly connected to the bottom surface of the center plate and an opposite second end adapted to automatically move into abutting engagement with the stop member when the center plate is moved into the upright rearward position to brace the center plate against subsequent pivotal movement in the forward direction;

center plate pivoting means adapted to be connected to the base plate for pivotally moving the center plate in the forward or rearward directions, the center plate pivoting means including actuating means for selectively operating the center plate pivoting means; and means for releasing the locking means, the releasing means adapted to be operatively disposed between the locking bar and the center plate pivoting means to automatically move said second end of the locking bar out of abutting engagement with the stop member to permit subsequent pivotal movement of the center plate in the forward direction when the center plate pivoting means is selectively operated by the actuating means to pivot the center plate in the forward direction from the upright rearward position.

11. The kit of claim 10, wherein the center plate pivoting means includes a mechanical linkage adapted to extend between the base plate and the bottom surface of the center plate; and the releasing means includes a first paddle adapted to be pivotally mounted on the bottom surface of the center plate and engageably-aligned with the mechanical linkage, a second paddle adapted to be pivotally mounted on the bottom surface of the center plate and engageably-aligned with the locking bar, a connecting rod adapted to extend between the first and second paddles to enable coordinated movement therebetween, and means for biasing the second paddle away from the locking bar when the first paddle is not in engagement with the mechanical linkage.

12. A dock leveler operable as a runoff guard for a loading dock, the dock leveler comprising:

a base plate adapted to be mounted onto the loading dock;

a center plate having a bottom surface and opposite first and second edges, said first edge of the center plate being pivotally connected to the base plate for pivotal movement of the center plate in forward and rearward directions between a forward position and an upright rearward position;

a lip plate having opposite first and second edges, said first edge of the lip plate being pivotally connected to said second edge of the center plate for pivotal movement of the lip plate between a retracted position and an extended position;

a stop member attached to the base plate, said stop member including at least one gusset plate extending from the base plate and a stop plate affixed to the at least one gusset plate, the stop plate having a forward edge and an upper surface;

locking means for securing the center plate in the upright rearward position to selectively preclude pivotal movement of the center plate, said locking means being adapted to automatically secure pivotal movement of the center plate when the center plate is moved into the upright rearward position, said locking means including a locking bar having a first end hingedly connected to the bottom surface of the center plate and an opposite second end adapted to move into abutting engagement with the upper surface of the stop plate when the center plate is moved into the upright rearward position to brace the center plate against subsequent pivotal movement in the forward direction, said locking bar further including an extension member affixed proximate to and axially-extending beyond said second end of the locking bar to ensure abutting engagement of said second end of the locking bar with the stop plate upper surface by contacting the forward edge of the stop plate and preventing said second end of the locking bar from moving past the stop member.

* * * * *

UNITED STATES PATENT AND TRADEMARK OFFICE
CERTIFICATE OF CORRECTION

PATENT NO. : 5,343,583

DATED : September 6, 1994

INVENTOR(S) : Bobby A. Cook

It is certified that error appears in the above-identified patent and that said Letters Patent is hereby corrected as shown below:

Claim 4, column 13, line 28, delete "the" (first occurrence) and insert --to--.

Claim 10, column 14, line 7, delete "men, her" and insert --member--.

Signed and Sealed this

First Day of November, 1994

Attest:

BRUCE LEHMAN

*Attesting Officer*      *Commissioner of Patents and Trademarks*